United States Patent [19]

Belle

[11] Patent Number: 4,667,841

[45] Date of Patent: May 26, 1987

[54] TANK HAVING TWO HALF SHELLS

[75] Inventor: Jean P. Belle, Clermont-Ferrand, France

[73] Assignee: Gitral S.A., France

[21] Appl. No.: 810,064

[22] Filed: Dec. 17, 1985

[30] Foreign Application Priority Data

Dec. 21, 1984 [FR] France ................................ 84 20146

[51] Int. Cl.[4] ........................ B65D 8/08; B65D 25/04; F16L 55/04

[52] U.S. Cl. ........................................ 220/22; 138/30; 220/5 A; 220/85 B

[58] Field of Search ........................ 220/85 B, 5 A, 22; 138/30

[56] References Cited

U.S. PATENT DOCUMENTS

| | | | |
|---|---|---|---|
| 3,165,229 | 1/1965 | Paul | 138/30 |
| 3,174,658 | 3/1965 | Wittenberg | 138/30 |
| 3,236,411 | 2/1966 | Cander | 138/30 |
| 4,129,025 | 12/1978 | Carey | 138/30 |
| 4,304,038 | 12/1981 | Yabu | 220/5 A |
| 4,474,215 | 10/1984 | Richter | 138/30 |

FOREIGN PATENT DOCUMENTS

| | | | |
|---|---|---|---|
| 1337549 | 11/1973 | United Kingdom | 138/30 |

*Primary Examiner*—George E. Lowrance
*Attorney, Agent, or Firm*—Steele, Gould & Fried

[57] ABSTRACT

A tank formed using two half shells may be used as an expansion tank, expansion equalizer, pressurized fluid buffer tank or the like. Two half shells are provided with a projecting flared profile having a first section angled outwardly from the wall and a flange directed perpendicularly outwardly. The tank halves are joined by abutting the flanges, and the angularly offset sections adjacent the flanges form a bearing area or seat for sealing with an internal diaphragm. The diaphragm separates the tank into sections and is arranged at its end to receive and positively hold a ring of a profile complementary to the internal profile defined by the outwardly flaring sections adjacent the flanges of the tank. The flanges can be folded over one another and against the wall of the tank to physically attach the half shells.

6 Claims, 6 Drawing Figures

TANK HAVING TWO HALF SHELLS

SUMMARY OF THE INVENTION

This invention relates to a tank of the type having two assembled half-shells, which may be used as an expansion tank, expansion equalizer, pressurized fluid buffer tank, or the like.

A typical expansion tank, for example, is intended for heating systems to absorb increases in volume resulting from the temperature rise of the heating fluid. An example of such a tank is illustrated in FIG. 1, which shows a type of prior art diaphragm tank that is now marketed. The tank comprises two half-shells 1,2 made from cold rolled plate, with a peripheral connecting rim $1^1$, $2^1$, on each half shell, a sleeve 3 communicating with outside the tank and a valve 4 and valve cover 5. A flexible elastomeric diaphragm 6 separates water and air chambers on either side of the diaphragm, and a lock-beading ring 7 fixes the diaphragm in place. The two half-shells are connected together by a chain stitch spot welding operation that welds a seam between peripheral rims $1^1$ and $2^1$, thus ensuring that the tank unit is sealed.

The seam welding operation is long and requires many manual operations. Therefore, the seam welding accounts for a large part of the cost of the expansion tank. The quality and care of the seam forming operation are essential to operation of the tank.

The present application is the result of development efforts to develop a new design for connecting both half shells together in a way that has advantages including the reduction of the manufacturing and assembly costs while ensuring good reliability and sealing in the tank unit.

The invention meets its desired purposes by a special adaptation with respect to both half shells of the tank. The invention may also be applied to expansion equalizers, pressurized fluid buffer tanks and other tanks of the general type.

According to a first characteristic of the invention, a tank of the type including two half shells assembled together and having a diaphragm separating fluid chambers defined in the tank and a ring holding the diaphragm, is shaped such that both half shells project beyond the line of their side walls, defining a flaring portion with a first section offset outwardly and a second consecutive section turned outwardly and forming a flange. The half shells abut along said flanges while the adjacent offset consecutive sections form a bearing area or seat for the fluid-separating diaphragm. The diaphragm is arranged at its end to allow the insertion and holding of a ring, the profile of the ring being similar and complementary to the V-shaped profile defined by the consecutive sections of the two half shells adjacent the turned-out flanged parts. The flanges are assembled together by appropriate means.

According to a preferred embodiment, the flanges are lockseamed together by successive folding over operations, for example by reverse drawing, finally folding the flanges against the external wall of the tank.

These characteristics and others will be more apparent from the following description.

BRIEF DESCRIPTION OF THE DRAWINGS

Examples of the subject matter of the invention are illustrated, without limitation, in the figures of the drawings, wherein.

DETAILED DESCRIPTION OF THE PREFERRED EMBODIMENTS

The two half shells 10,11 of the tank, for example an expansion tank, each include a bottom wall $10^1$,$11^1$ respectively, and a peripheral side wall $10^2$,$11^2$ of indefinite height. According to the invention, both the half shells 10,11 defining the tank project beyond a line of their aforesaid side wall by a flared profile. The profile has a wall section $10^3$,$11^3$ angularly offset outwardly from the line of the wall, then a second consecutive section $10^4$,$11^4$ contiguous with the offset section and forming a flange also directed outwardly. The second consecutive section forming the flange is directed in a plane perpendicular to the line of the wall $10^2$,$11^2$ of each of the half shells of the tank. When the half shells are abutted, the flanges $10^4$,$11^4$ rest directly in contact, thus ensuring perfect stability of the two half shells with respect to one another. Sealing is ensured when joining the half shells by squeezing the diaphragm located between the ring 13 and the flared sections $10^3$,$11^3$ of both half shells. A concave area is defined by the two consecutive offset sections $10^3$,$11^3$ of the two half shells, which are sufficiently long and disposed at an open angle to ensure the engagement and centering of the end $12^1$ of the fluid separating diaphragm of the tank, namely an expansion tank in this particular case. The elastomeric diaphragm, for example, can be provided at the sealing end with projecting packing protrusions $12^2$,$12^3$ or equivalent elements allowing insertion and then positive holding of a metal ring 13, the profile of which ring is similar and complementary, and even strictly parallel to the profile defined by the two consecutive sections $10^2$,$11^2$ offset from the walls.

The ring, the shape of which is complementary to the tank shape, has a perimeter noticably smaller than the inside perimeter of the tank, in this case an expansion tank, to thereby fit the diaphragm. The ring presses the diaphragm into the seat shape defined by the consecutive flaring sections $10^2$,$11^2$, and thus ensures a complete sealing effect.

The diaphragm is fixed at its edges but movable in the tank in the usual manner according to known embodiments. Thus the diaphragm has a double function, i.e., the diaphragm seals the tank halves, and defines changeable inside volumes on either side of the diaphragm within the tank, according to the fluid pressures in each of the tank chambers.

Figure 1:
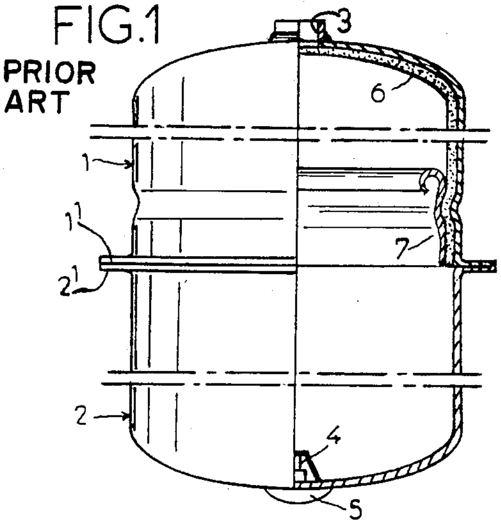
FIG.1 PRIOR ART
FIG. 1 is a partial section view of a tank according to the aforesaid type, for example an expansion tank.
Figure 2:
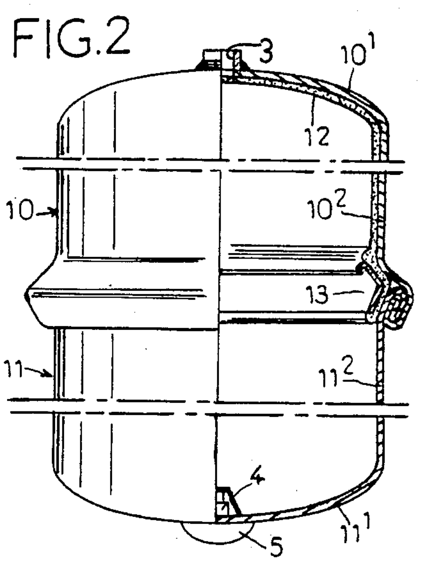
FIG. 2 is a corresponding partial section view of the tank according to the invention, embodied as an expansion tank.
Figure 3:
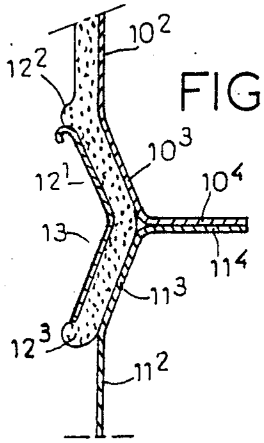
FIGS. 3-6 are enlarged views illustrating the area at which the half shells connect, showing the joining method of the half shells.

In FIG. 3, the junction of both half shells has been sealed by squeezing the diaphragm between the conically-shaped internal ring and the consecutive tank wall sections $10^2$,$10^3$, the sections and the ring being shaped complementarily. The flanges of the two half shells may be joined more permanently by gluing them, or otherwise and more advantageously, by lock seaming as illustrated by progressive steps shown FIGS. 3-6.

Figure 4:
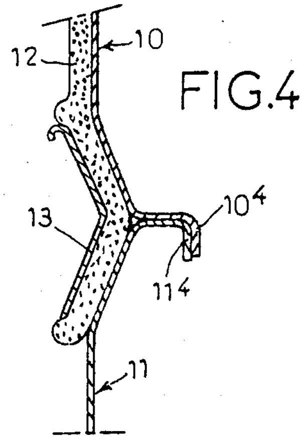
Figure 5:
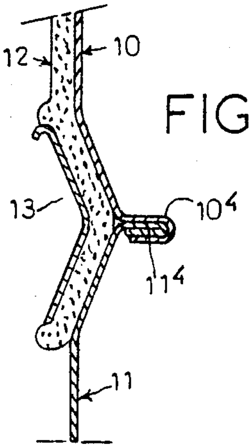
Figure 6:
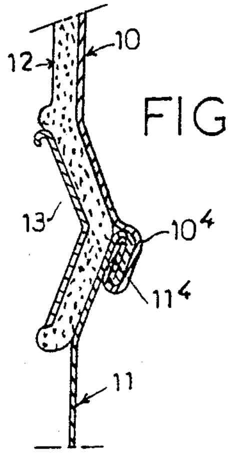

FIG. 4 shows the rough lock seaming. The flanges $10^4$,$11^4$ are folded down 90 degrees from their middle part, for example by reverse drawing. Then, as shown if FIG. 5, the flanges are folded further such that the interlocking seam is closed. In FIG. 6, the flange can be bent using almost any tool to complete the aforesaid lock seam, the flange being bent along wall $11^1$ of the lower shell of the tank.

This lock seaming method is made possible in part by the special shape of the ends of the tank walls. The method is especially advantageous and noticeably reduces the manufacturing costs of the tanks. Sealing is guaranteed by the combined function of the diaphragm sealing to and between the half shells.

This invention may be embodied in any type of tank, for example expansion tanks, expansion equalizers, pressurized fluid buffer tanks and the like. These tanks may have any shape or size.

The invention is not limited to the particular preferred embodiments and methods which have been specifically stated. The invention covers all the variations and reference should be made to the appended claims rather than the foregoing specification as indicating the scope of the invention.

I claim:

1. An improved tank of the type including half-shells assembled together with a diaphragm separating an internal space into fluid chambers and a connecting ring, comprising:

two half-shells each having edge portions projecting outwardly beyond a line defined by lateral walls of the half shells defining a flared profile, each half shell having a first section offset outwardly and a flange consecutive to the offset section and directed perpendicularly outwardly, the two half shells abutting on their respective flanges and the consecutive sections forming a bearing seat for the diaphragm, the diaphragm movably separating the tank into the fluid chambers, said diaphragm being arranged on its open end to receive and hold a ring having a profile complementary to a V-shaped profile defined by the two consecutive sections, the flanges having a long radial extension and being assembled together by being folded over one another and against said half shells.

2. A tank according to claim 1, wherein the open end of the diaphragm has projecting packings, the packings extending upwardly and ensuring correct insertion and holding of the ring, the ring being metal shaped like a bushing.

3. A tank according to claim 2, wherein the ring has an outer perimeter appreciably smaller than an inside perimeter of the tank, the ring being closely fitted to the diaphragm and tank to ensure a full sealing between the fluid chambers.

4. A tank according to claim 1, wherein the tank is embodied as an expansion tank.

5. A tank according to claim 1, wherein the tank is embodied as an expansion equalizer.

6. A tank according to claim 1, wherein the tank is embodied as a pressurized fluid buffer tank.

* * * * *